(12) United States Patent
Kotani

(10) Patent No.: US 12,139,261 B2
(45) Date of Patent: Nov. 12, 2024

(54) PROPULSION SYSTEM, ANTI-ICING METHOD OF ROTOR AND AIRCRAFT

(71) Applicant: SUBARU CORPORATION, Tokyo (JP)

(72) Inventor: Kazuaki Kotani, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 107 days.

(21) Appl. No.: 17/699,921

(22) Filed: Mar. 21, 2022

(65) Prior Publication Data

US 2022/0212806 A1 Jul. 7, 2022

Related U.S. Application Data

(63) Continuation of application No. PCT/JP2020/037668, filed on Oct. 3, 2020.

(30) Foreign Application Priority Data

Nov. 12, 2019 (JP) ................. 2019-204598

(51) Int. Cl.
*B64D 15/06* (2006.01)
*B64U 20/60* (2023.01)
(Continued)

(52) U.S. Cl.
CPC ............. *B64D 15/06* (2013.01); *B64U 20/60* (2023.01); *B64U 20/70* (2023.01); *B64U 30/20* (2023.01);
(Continued)

(58) Field of Classification Search
CPC ..... B64D 15/00–08; H02K 9/20; H02K 9/225
See application file for complete search history.

(56) References Cited

U.S. PATENT DOCUMENTS 4,741,499 A 5/1988 Rudolph et al.
8,601,965 B2 12/2013 Shah et al.
(Continued)

FOREIGN PATENT DOCUMENTS

CA 2775619 A1 * 5/2011 ............. B82Y 30/00
CN 202402222 U 8/2012
(Continued)

OTHER PUBLICATIONS

Translation of the International Preliminary Report on Patentability and the Written Opinion of the International Search Authority issued in corresponding International Patent Application No. PCT/JP2020/037668, dated May 17, 2022.
(Continued)

*Primary Examiner* — Assres H Woldemaryam
*Assistant Examiner* — Anna L. Gordon
(74) *Attorney, Agent, or Firm* — Rimon P.C.

(57) ABSTRACT

According to one implementation, a propulsion system includes a rotor, a motor and an anti-icing mechanism. The rotor has blades. The motor rotates the rotor. The anti-icing mechanism deices the blades using heat generated by driving of the motor. Further, according to one implementation, an aircraft includes the above-mentioned propulsion system. Further, according to one implementation, an anti-icing method of a rotor having blades includes deicing the blades using heat generated by driving of a motor for rotating the rotor.

20 Claims, 2 Drawing Sheets

(51) Int. Cl.
  *B64U 20/70* (2023.01)
  *B64U 30/20* (2023.01)
  *B64U 50/19* (2023.01)
  *H02K 1/32* (2006.01)
  *H02K 9/20* (2006.01)
  *H02K 9/22* (2006.01)

(52) U.S. Cl.
  CPC .............. *B64U 50/19* (2023.01); *H02K 1/32* (2013.01); *H02K 9/20* (2013.01); *H02K 9/225* (2021.01)

(56) References Cited

U.S. PATENT DOCUMENTS

| | | |
|---|---|---|
| 9,561,860 B2 | 2/2017 | Knapp et al. |
| 10,513,340 B2 | 12/2019 | Garnett et al. |
| 10,807,729 B2 * | 10/2020 | Vondrell ................ H02K 1/274 |
| 10,823,066 B2 | 11/2020 | Miller et al. |
| 11,279,492 B2 | 3/2022 | Garnett et al. |
| 2012/0107133 A1 | 5/2012 | Bulin et al. |
| 2013/0058793 A1* | 3/2013 | McGlaun ................ B64C 27/72 |
| | | 416/96 A |
| 2018/0176991 A1* | 6/2018 | Gagnon ................ H05B 3/008 |
| 2018/0233987 A1* | 8/2018 | Steinbach ................ H02K 3/47 |
| 2019/0118943 A1* | 4/2019 | Machin ................ B64C 11/30 |

FOREIGN PATENT DOCUMENTS

| | | | | |
|---|---|---|---|---|
| CN | 203130361 U | | 8/2013 | |
| CN | 103569366 A | | 2/2014 | |
| CN | 105599906 A | * | 5/2016 | |
| CN | 106907192 A | | 6/2017 | |
| CN | 110065638 A | | 7/2019 | |
| DE | 102017106774 A1 | * | 10/2018 | ............. B64C 27/46 |
| DE | 102018102506 B3 | * | 3/2019 | |
| GB | 2491951 A | * | 12/2012 | ............. B64D 15/02 |
| JP | S6470298 A | * | 3/1989 | |
| JP | 2013-511414 A | | 4/2013 | |
| JP | 2013-151647 A | | 8/2013 | |
| JP | 2017-527059 A | | 9/2017 | |

OTHER PUBLICATIONS

International Search Report issued in corresponding International Patent Application No. PCT/JP2020/037668, dated Dec. 1, 2020, with English translation.

Office Action dated on Mar. 8, 2024 issued in the corresponding Chinese Patent Application No. 202080073165.5, w/ English Translation.

* cited by examiner

PROPULSION SYSTEM, ANTI-ICING METHOD OF ROTOR AND AIRCRAFT

CROSS REFERENCES TO RELATED APPLICATIONS

This is a continuation of Application PCT/JP2020/37668, filed on Oct. 3, 2020.

This application is based upon and claims the benefit of priority from Japanese Patent Application No. 2019-204598, filed on Nov. 12, 2019; the entire contents of which are incorporated herein by reference.

FIELD

Implementations described herein relate generally to a propulsion system, an anti-icing method of a rotor and an aircraft.

BACKGROUND

In recent years, an aircraft for UAM (Urban Air Mobility) has been proposed for practical use by various manufacturers. UAV (Unmanned Aerial Vehicle) used as an aircraft for UAM is also called a drone. Typical examples of UAV include a rotorcraft, such as an unmanned multi-copter and a helicopter. As typical features, an aircraft for UAM has motors and rotors whose pitch angle of blades is fixed.

In order to put UAM into practical use, it is important to secure the safety of an aircraft for UAM equivalently to that of the conventional aircraft. One of functions for securing the safety of an aircraft is a function to prevent icing of rotors under a low-temperature environment from a viewpoint of preventing degradation in aerodynamic performance of the rotors.

Accordingly, deicing has been conventionally practiced by a method of attaching an electrical heating member to each rotor of UAV. Similarly, in order to give an anti-icing function to a fixed wing or a rotary wing of an aircraft, a technique to dispose a proper quantity of carbon nanotube in a portion where ice is easy to be generated, and heat the carbon nanotube by making electrical current flow through the carbon nanotube has been also proposed (for example, refer to Japanese Patent Application Publication JP2013-511414 A).

As mentioned above, in order to secure the safety of an aircraft including not only an aircraft for UAM but another aircraft, it is important to prevent icing on a wing surface of the aircraft.

Accordingly, an object of the present invention is to suppress the icing on a rotor of an aircraft effectively.

SUMMARY OF THE INVENTION

In general, according to one implementation, a propulsion system includes a rotor, a motor and an anti-icing mechanism. The rotor has blades. The motor rotates the rotor. The anti-icing mechanism deices the blades using heat generated by driving of the motor.

Further, according to one implementation, an aircraft includes the above-mentioned propulsion system.

Further, according to one implementation, an anti-icing method of a rotor having blades includes deicing the blades using heat generated by driving of a motor for rotating the rotor.

DETAILED DESCRIPTION

A propulsion system, an anti-icing method of a rotor and an aircraft according to implementations of the present invention will be described with reference to the accompanying drawings.

(Structure and Function)

Figure 1:
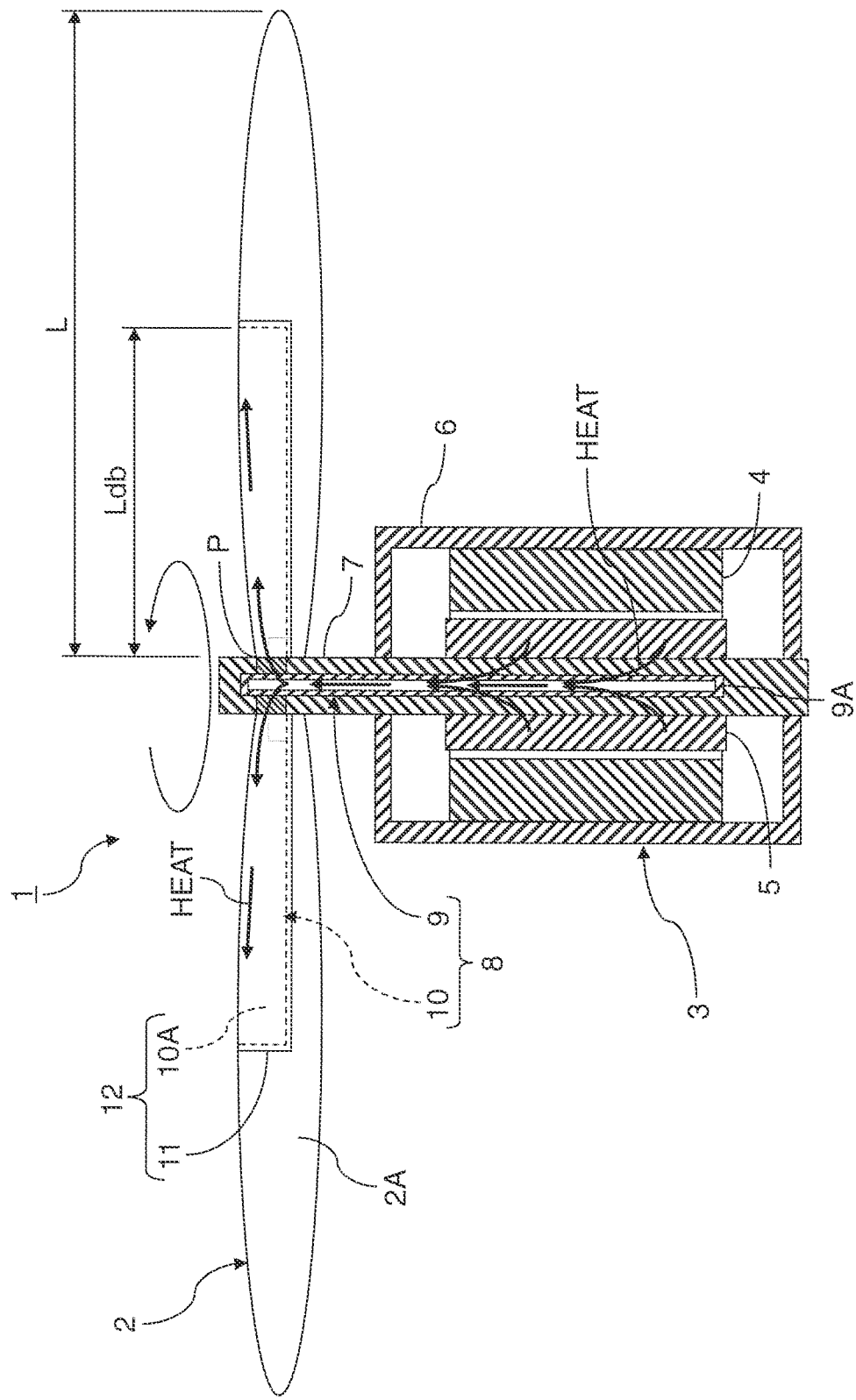
FIG. 1 shows structure of a propulsion system according to an implementation of the present invention.

FIG. 1 shows structure of a propulsion system according to an implementation of the present invention.

A propulsion system 1 is an electrically-operated rotating device included in an aircraft, such as a fixed wing aircraft or a rotorcraft, in order to obtain thrust and/or lift by forming an air flow. The electric propulsion system 1 includes a rotor 2 having blades 2A, and a motor 3 for rotating the rotor 2. The rotor 2 is sometimes called a fan or a propeller. A fan covered with a cylindrical duct is called a ducted fan.

The motor 3 is typically composed of a cylindrical stator 4, a cylindrical rotor 5 and a cylindrical casing 6. The cylindrical stator 4 and the cylindrical rotor 5 are disposed coaxially and housed by the cylindrical casing 6. The stator 4 is fixed to the casing 6. Meanwhile, the rotor 5 is rotatably disposed relatively to the stator 4, and integrated with a rotating shaft 7 of the motor 3. One end of the rotating shaft 7 is projected from the casing 6 so as to function as an output shaft of the motor 3.

Accordingly, the respective blades 2A are radially fixed to the end part of the rotating shaft 7 protruding from the casing 6. Specifically, each blade 2A is disposed so that the length direction of the blade 2A may be directed in the rotating radius direction of the blade 2A, and one end of each blade 2A is fixed to the rotating shaft 7 of the motor 3.

When the rotor 2 of the propulsion system 1 configured as described above is rotated by driving the motor 3, thrust and/or lift can be given to an aircraft to which the propulsion system 1 is attached. In addition, it is important to prevent the icing on each blade 2A of the rotor 2 in order to secure the safety of the aircraft.

Accordingly, the propulsion system 1 has an anti-icing mechanism 8 which deices the respective blades 2A. The anti-icing mechanism 8 is a deicer configured to deice the blades 2A by utilizing heat generated due to driving of the motor 3. More specifically, driving of the motor 3 generates heat in the rotor 5 of the motor 3. Accordingly, the blades 2A can be deiced by effectively utilizing the heat generated at the time of driving the motor 3.

In order to transmit the heat generated in the motor 3 to each blade 2A of the rotor 2, it is realistic to use the rotating shaft 7 as a path of the heat. Accordingly, the anti-icing mechanism 8 has at least the first heat transfer member 9 disposed inside the rotating shaft 7 of the motor 3. The first heat transfer member 9 is composed of a member having thermal conductivity higher than that of the rotating shaft 7 of the motor 3, and includes at least one of the first heat conductor and the first heat transferring fluid. The first heat transfer member 9 is disposed at least between the rotor 5 of the motor 3 and a coupling portion P of the rotating shaft 7 to each blade 2A, along the length direction of the rotating shaft 7.

When the first heat transfer member 9 is disposed inside the rotating shaft 7, the heat generated in the motor 3 can be transferred from the rotor 5 side of the motor 3 toward each blade 2A side of the rotor 2 through the first heat transfer member 9. That is, the heat generated in the motor 3 can be transferred up to the tip of the rotating shaft 7. Thereby, it becomes possible to transmit the heat to the root side of each blade 2A so as to prevent the icing of the blades 2A.

In order to deice the surfaces of the blades 2A more effectively, it is important to transmit the heat to areas on the surfaces of the blades 2A, on which ice is easily attached. For that reason, the anti-icing mechanism 8 can have the second heat transfer members 10 in addition to the first heat transfer member 9. At least a part of the second heat transfer member 10 is member 10 is composed of a member having thermal conductivity higher than that of the blade 2A, and includes at least one of the second heat conductor and the second heat transferring fluid. The second heat transfer members 10 each contacts with the first heat transfer member 9 in the coupling portion P of the rotating shaft 7 to each blade 2A. The second heat transfer members 10 extend from the coupling portion P of the rotating shaft 7 to each blade 2A, in radiation directions of which central axis is the rotating shaft 7, i.e., in the longitudinal directions of the blades 2A.

When the second heat transfer members 10 are disposed on the blades 2A respectively, the heat transferred by the first heat transfer member 9 can be transferred to areas to be deiced on the blades 2A by the second heat transfer members 10 respectively. Thereby, it becomes possible to transmit the heat to the areas to be deiced, on which ice is easily attached, on the surfaces of the blades 2A.

Experientially, it is considered that it is desired to attach a heat conducting member, as each of the second heat transfer members 10, in each range from the coupling portion P of the rotating shaft 7 to each blade 2A (which is the root position of each blade 2A) to a position away from the root position by a distance of ½ of the length L of the blade 2A, from a viewpoint of obtaining a sufficient anti-icing function. The end parts of the second heat transfer members 10 may be embedded in the vicinity of the tip of the rotating shaft 7 so as to contact with the end part of the first heat transfer member 9. Thereby, the heat transferred though the first heat transfer member 9 can be led to the second heat transfer members 10 with reducing loss as much as possible.

As for each of the first heat transfer member 9 and the second heat transfer members 10, an appropriate material or device including at least one of a heat conductor and fluid for transferring heat can be used so that sufficient heat for deicing can be transferred to each blade 2A.

Figure 2:
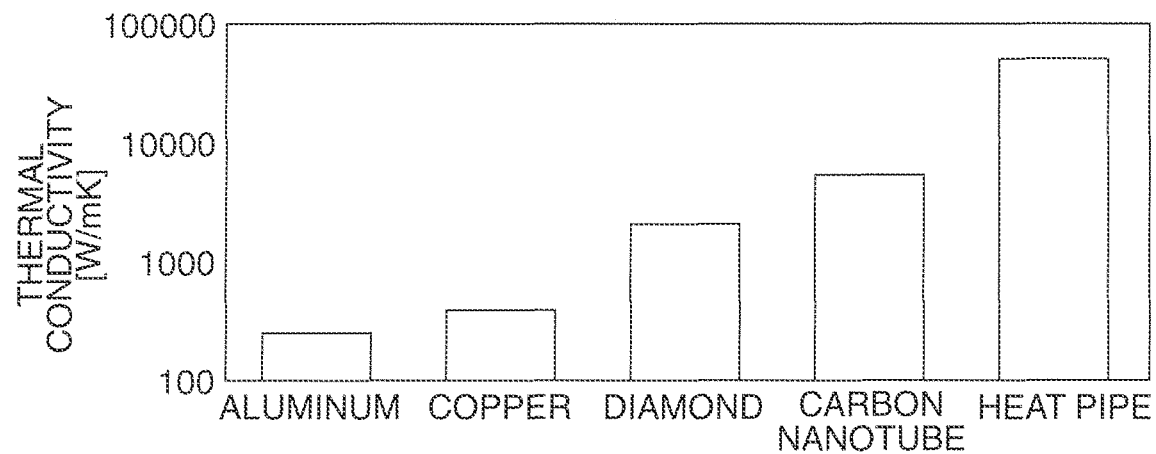
FIG. 2 shows a graph showing thermal conductivity of various heat transfer members.

FIG. 2 shows a graph showing thermal conductivity of various heat transfer members (heat conductors).

In FIG. 2, the vertical axis shows thermal conductivity (W/mK). As shown in FIG. 2, carbon nanotube and a heat pipe each has higher thermal conductivity than that of aluminum or copper which is known by its satisfactory thermal conductivity. Carbon nanotube is macroscopically powdered, and therefore does not usually have necessary strength by itself. For that reason, a material or device whose thermal conductivity is high, such as a material containing carbon nanotube or a heat pipe, can be used as each of the first heat transfer member 9 disposed in the rotating shaft 7 of the motor 3 and the second heat transfer members 10 disposed on the blades 2A. Thereby, more heat can be transferred from the motor 3 to each blade 2A.

Carbon nanotube, which is an allotrope of carbon having cyclic structure, is sometimes classified as one kind of fullerene. One sheet of carbon nanotube having a single cylindrical shape is called a single-layer carbon nanotube or a single-walled carbon nanotube, two cylindrical sheets of carbon nanotube disposed coaxially are called a double-layer carbon nanotube or a double-walled carbon nanotube, and two or more cylindrical sheets of carbon nanotube disposed coaxially are called a multi-layer carbon nanotube or a multi-walled carbon nanotube. Carbon nanotube may open at both ends or close at both ends or one end with structure similar to that of fullerene.

Examples of a substance whose element is carbon include carbon fiber and diamond besides carbon nanotube. Therefore, carbon fibers or diamond may be used as at least one of the first heat transfer member 9 and the second heat transfer members 10.

Carbon fiber has anisotropic thermal conductivity, and therefore it is appropriate to dispose carbon fibers so that each of the length directions of the carbon fibers may be in the heat transfer direction when the carbon fibers are used as at least one of the first heat transfer member 9 and the second heat transfer members 10. More specifically, when carbon fibers are used as the first heat transfer member 9, it is appropriate to dispose the carbon fibers so that each of the length directions may be in the heat transfer direction directed from the rotor 5 side of the motor 3 toward the blade 2A side of the rotor 2. Meanwhile, when carbon fibers are used as the second heat transfer member 10, it is appropriate to dispose the carbon fibers so that each of the length directions may be in the heat transfer direction directed from the first heat transfer member 9 side toward the area to be deiced on the blade 2A.

On the other hand, when carbon nanotube is used as at least one of the first heat transfer member 9 and the second heat transfer members 10, it is practical to mix the powdered carbon nanotube with resin or metal into a rod-shaped, string-shaped or sheet-like heat conducting member to be used as at least one of the first heat transfer member 9 and the second heat transfer members 10. In this case, most heat is conducted through the carbon nanotube while the quantity of the heat conducted through the matrix of the carbon nanotube is negligibly small. Therefore, when the matrix of the carbon nanotube is made of metal, a desired metal can be used regardless of its thermal conductivity as long as the mechanical strength can be secured.

As a practical example, iron based metal, such as stainless steel, whose specific strength is high, or aluminum can be used as the matrix of carbon nanotube since weight reduction is required for an aircraft. In that case, a rod, a wire or a sheet containing carbon nanotube can be produced by casting a metal ingot or the like mixed with powdered carbon nanotube.

Meanwhile, when resin is used as the matrix, not only carbon nanotube but carbon fibers can be contained easily. Specifically, a rod, a rope or a sheet containing carbon nanotube or carbon fibers can be produced by impregnating powdered carbon nanotube or carbon fibers with melt thermoplastic resin or melt thermosetting resin, and subsequently curing the resin.

On the other hand, a heat pipe is a heat transfer element consisting of a metal pipe sealing small quantity of operating fluid, such as water, in the vacuum inside. When heat has reached one end of a heat pipe on the high temperature side, the operating fluid serving as heat transferring fluid absorbs the heat to evaporate into a vapor flow. The vapor flow moves to the low temperature side. The vapor flow, which has moved to the low temperature side, contacts with the inner wall of the metal pipe and is cooled down, and thereby condenses and returns into the liquid while dissipating the heat. The operating fluid, which has returned into the liquid, returns to the high temperature side due to the capillarity or the gravity. Therefore, when both ends of a heat pipe are disposed at positions having a difference in temperature, heat can be transferred from the high temperature side to the low temperature side by utilizing the absorption of the evaporation latent heat and the radiation of the condensation latent heat by the operating fluid.

Since heat is conducted by the wall body of the metal pipe at each end of the heat pipe, it is desirable that at least both ends of the metal pipe are made of metal, such as aluminum or copper, having high thermal conductivity. Meanwhile, in the portion other than each end of the heat pipe, the heat is transferred by movement of a vapor flow. Therefore, heat is not transmitted by heat conduction but transmitted by convective heat transfer strictly. Nevertheless, a heat pipe has been considered as a heat conductor in FIG. 2, and the thermal conductivity of the heat pipe has been estimated. Therefore, a heat pipe can be used as at least one of the first heat transfer member 9 and the second heat transfer members 10 with considering the heat pipe as a heat conductor.

Since the blades 2A rotate, the centrifugal force toward the tip sides of the blades 2A act on the second heat transfer members 10 attached to the blades 2A respectively. Therefore, using a heat pipe as the second heat transfer member 10 may causes trouble that the operating fluid stands on the low temperature side and does not return. For that reason, the second heat transfer member 10 may be made of at least one of carbon nanotube and carbon fibers without using a heat pipe.

On the other hand, although the first heat transfer member 9 also rotates around the rotation axis of the motor 3 together with the rotating shaft 7, the length direction of the first heat transfer member 9 having elongated structure, such as a columnar shape or a cylindrical shape, is same as the length direction of the rotating shaft 7. Therefore, the direction in which the centrifugal force acts on the first heat transfer member 9 is not same as the length direction of the first heat transfer member 9, i.e., the direction in which heat is transferred. For that reason, the first heat transfer member 9 can be made of at least one of a heat pipe, carbon nanotube and carbon fibers.

Accordingly, one part of a common rod-shaped or string-shaped heat conducting member including carbon nanotube or carbon fibers may be disposed inside the rotating shaft 7 of the motor 3 as the first heat transfer member 9 while other parts may be embedded in the blades 2A as the second heat transfer members 10 respectively. Nevertheless, a heat pipe has higher thermal conductivity than that of carbon nanotube as shown in FIG. 2 and also has higher specific strength than that of carbon nanotube.

Accordingly, as a practical example of structure exemplified by FIG. 1, the heat pipe 9A having lighter weight, higher strength and higher thermal conductivity may be disposed, as the first heat transfer member 9, inside the rotating shaft 7 which is required to have high rigidity while a heat conducting member 10A containing carbon nanotube may be disposed, as the second heat transfer member 10, on each blade 2A side on which the centrifugal force acts in the heat transfer direction.

When the heat conducting member 10A including at least one of carbon nanotube and carbon fibers is used as the second heat transfer member 10, the sheet-like or rope-like heat conducting member 10A can be stuck on the surface of the blade 2A, and the stuck heat conducting member 10A can be covered by a rubber 11 for preventing damage. In general, an implement for preventing the icing of an aircraft during flight is called a deicing boot. Therefore, it can be said that deicing boots 12 of the blades 2A are each composed of the second heat transfer member 10 and the rubber 11. As described above, the sufficient deicing effect can be obtained as long as the length Ldb of the deicing boot 12 is not less than the half of the length L of the blade 2A, i.e., the radius of rotation of the rotor 2.

As a matter of course, the heat conducting member 10A may be embedded in each of the blades 2A. In particular, the heat conducting member 10A made of carbon nanotube or carbon fibers has high flexibility in shape conducting member made of carbon nanotube or carbon fibers may be disposed inside the rotor 5 of the motor 3 and/or between the rotor 5 and the rotating shaft 7, as a path for heat transfer in the rotor 5, as well as each blade 2A.

As mentioned above, while a desired material or device can be used as each of the first heat transfer member 9 and the second heat transfer members 10, an appropriate material or device having an appropriate size and shape which satisfy requirements can be determined by heat balance calculation. As long as heat transfer conditions are satisfied by heat balance calculation, not only carbon or a heat pipe but another material, such as aluminum or copper, may be used.

When it is defined that the surface area of an object is A (m$^2$), the emissivity of the object surface is B, the convection heat transfer coefficient to the outside air is C (W/m$^2$K), the temperature of the object surface is D (° C.) and the temperature of the atmosphere is E (° C.), the convection heat loss F (W) from the object surface, the radiant heat loss G (W) and the heat loss H (W) are represented by the following formulas.

$$F=(D-E)\times A\times C$$

$$G=\{(D+273.15)^4-(E+273.15)^4\}\times A\times B\times \sigma$$

$$H=F+G$$

wherein σ is the Stefan-Boltzmann constant.

When the diameter of the rotor 2 is 2 (m), the length Ldb of the deicing boot 12 is 0.5 (m) which is the half of the length L of the blade 2A. Therefore, when the width of the deicing boot 12 is 0.2 (m) and the number of the blades 2A is three, the surface area A of the deicing boots 12 is 0.5×0.2×3=0.3 (m$^2$). Furthermore, when the heat loss H from the surfaces of the deicing boots 12, necessary to keep the temperature D of the surfaces of the deicing boots 12 at 2 (° C.) in forced convection at the temperature E=−55 (° C.) of the atmosphere, is calculated by the above-mentioned formulas with using the emissivity B=0.9 of graphite as that of carbon nanotube or carbon fibers and assuming the convection heat transfer coefficient C=100 (W/m$^2$K) to the outside air, the heat loss H becomes about 1.8 (kW).

When the output of the motor 3 is 200 (kW), the heat loss H=1.8 (kW) is equivalent to about 1% of the output of the motor 3. Therefore, in the case where the energy efficiency of the motor 3 is 95%, a deicing effect to be achieved can be sufficiently obtained as long as 20% of the calorific value of the motor 3 can be transferred to the deicing boots 12 each composed of the heat conducting member 10A made of carbon nanotube or carbon fibers. Hence, what is necessary is to determine conditions, including the thermal conductivity and the cross sectional area, of the first heat transfer member 9 so that 20% of the calorific value of the motor 3 can be transferred.

The output of the motor 3 is determined depending on the sizes of the blades 2A and the surface areas A of the deicing boots 12. Therefore, it is considered that the deicing effect of the blades 2A can be obtained to a certain extent as long as not less than 15% of the heat generated by the motor 3 can be transmitted to the blades 2A. In particular, it is considered according to the above-mentioned calculation example that a sufficient deicing effect of the blades 2A can be obtained as long as not less than 20% of the heat generated by the motor 3 can be transmitted to the blades 2A.

For that reason, it is appropriate to determine conditions including the thermal conductivity of the first heat transfer member 9, consisting of a heat conducting member or a heat pipe, for transmitting the heat generated by the motor 3 to the blades 2A so that not less than 15%, more preferably not less than 20% of the heat generated by the motor 3 can be transmitted to the blades 2A. That is, it is appropriate that the anti-icing mechanism 8 has a function to transmit not less than 15%, more preferably not less than 20% of the heat generated by the motor 3 to the blades 2A for deicing the blades 2A.

As described above, the propulsion system 1 and the anti-icing method of the rotor 2 deice the blades 2A by utilizing heat generated due to driving of the motor 3. The propulsion system 1 having such a deicing function can be used as a rotor of an aircraft.

Figure 3:
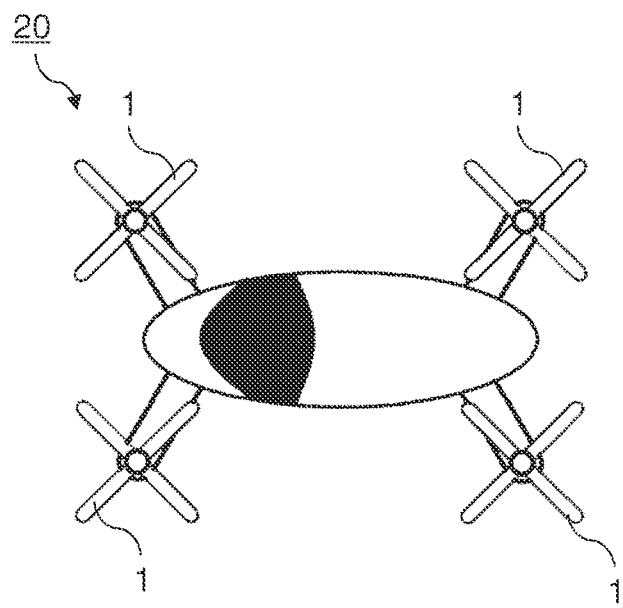
FIG. 3 is a perspective view showing an example of an aircraft 20 having the propulsion system 1 exemplified in FIG. 1.

FIG. 3 is a perspective view showing an example of an aircraft 20 having the propulsion system 1 exemplified in FIG. 1.

As exemplified in FIG. 3, the propulsion system 1 can be used by being attached to an aircraft 20. The aircraft 20 to which the propulsion system 1 is attached may be not only a UAV, which people do not board, but a manned aircraft, which people board, or an OPV (Optionally Piloted Vehicle). An OPV is an unmanned aerial vehicle which a pilot can also board and control, i.e., a hybrid aircraft of a manned aircraft and an unmanned aircraft. A UAV is also called a drone, and a typical UAV is an unmanned rotorcraft, such as a multi-copter or a helicopter. As a matter of course, the electric propulsion system 1 may be used as a propulsion system, composed of a propeller and a motor, attached to a leading edge or the like of a main wing of a manned or unmanned fixed wing aircraft.

When the aircraft 20 has a plurality of the propulsion systems 1, heat transfer conditions of the anti-icing mechanism 8 can be determined for every propulsion system 1 by heat balance calculation. Therefore, the heat transfer conditions of one anti-icing mechanism 8 may be made different from those of another anti-icing mechanism 8 according to respective positions at which the rotors 2 are disposed.

(Effects)

According to the propulsion system 1, the anti-icing method of the rotor 2, and the aircraft 20 as described above, the blades 2A can be deiced by utilizing heat of the motor 3 which has been conventionally discharged out to the atmosphere. Accordingly, it becomes unnecessary to attach dedicated cooling structure or a dedicated cooling device to the motor 3 and attach dedicated deicing structure or a dedicated deicing device to each blade 2A, which leads to simplification in structure and weight reduction of the propulsion system 1.

In particular, a UAV has been conventionally deiced using electric heating members typically, and therefore a battery can be saved. That is, battery saving and cooling of the motor 3 are compatible in a UAV. As a matter of course, the conventional anti-icing technique may also be used together.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A propulsion system for an aircraft, the propulsion system comprising:
   rotor blades;
   a motor including a stator and a rotor;
   a rotating shaft having i) a first portion where the rotor of the motor is mounted around the rotating shaft, and ii) a second portion where the rotor blades are attached to the rotating shaft, wherein the rotating shaft transfers power from the motor to rotate the rotor blades; and
   a first heat transfer member disposed inside the rotating shaft to extend from the first portion to the second portion of the rotating shaft such that the first heat transfer member contacts the rotor of the motor at the first portion via a lateral surface of the rotating shaft;
   second heat transfer members respectively disposed on the rotor blades to contact the first heat transfer member at the second portion via the lateral surface of the rotating shaft,
   wherein the first heat transfer member receives heat generated in the motor via the first portion of the rotating shaft and transfers the heat to the second heat transfer member via the second portion of the rotating shaft to deice the rotor blades; and
   wherein the first heat transfer member includes at least one of a first heat conductor and a heat pipe including a first heat transferring fluid, and the first heat conductor is made of at least one of carbon fibers and a material containing carbon nanotube.

2. The propulsion system according to claim 1, wherein the first heat transfer member has thermal conductivity higher than thermal conductivity of the rotating shaft.

3. The propulsion system according to claim 2,
   wherein the second heat transfer members have thermal conductivity higher than thermal conductivity of the rotor blades,
   wherein the second heat transfer members transfer the heat from the first heat transfer member to the rotor blades respectively, and
   wherein the second heat transfer members each include at least one of a second heat conductor and a second heat transferring fluid.

4. The propulsion system according to claim 3,
   wherein each second heat conductor is attached to the second end of the rotating shaft,
   wherein the rotor blades extend from the second end of the rotating shaft, and
   wherein each second heat conductor extends from the second end of the rotating shaft to halfway along a length of each respective blade rotor.

5. The propulsion system according to claim 4,
wherein each second heat conductor is made of at least one of carbon fibers and a material containing carbon nanotube.

6. The propulsion system according to claim 4, further comprising:
deicing boots attached to the rotor blades respectively, the deicing boots including the second heat transfer members and rubbers disposed on surfaces of the second heat transfer members respectively.

7. The propulsion system according to claim 3,
wherein each second heat conductor is made of at least one of carbon fibers and a material containing carbon nanotube.

8. The propulsion system according to claim 7, further comprising:
deicing boots attached to the rotor blades respectively, the deicing boots including the second heat transfer members and rubbers disposed on surfaces of the second heat transfer members respectively.

9. The propulsion system according to claim 3, further comprising:
deicing boots attached to the rotor blades respectively, the deicing boots including the second heat transfer members and rubbers disposed on surfaces of the second heat transfer members respectively.

10. The propulsion system according to claim 3,
wherein the first heat transfer member and the second heat transfer member are configured to deice the rotor blades by transmitting, to the rotor blades, not less than 15% of the heat generated by the motor.

11. An aircraft comprising:
the propulsion system according to claim 3.

12. The propulsion system according to claim 3, wherein an end of each second heat conductor is embedded in the second end of the rotating shaft so that each second heat conductor is in contact with the first heat conductor.

13. The propulsion system according to claim 2,
wherein the first heat transfer member and the second heat transfer member are configured to deice the rotor blades by transmitting, to the rotor blades, not less than 15% of the heat generated by the motor.

14. An aircraft comprising:
the propulsion system according to claim 2.

15. The propulsion system according to claim 1,
wherein the first heat transfer member and the second heat transfer member are configured to deice the rotor blades by transmitting, to the rotor blades, not less than 15% of the heat generated by the motor.

16. An aircraft comprising:
the propulsion system according to claim 15.

17. An aircraft comprising:
the propulsion system according to claim 1.

18. An anti-icing method for the propulsion system according to claim 1, the method comprising:
deicing the rotor blades using the heat generated by driving of the motor for rotating the rotor blades.

19. The anti-icing method of the rotor according to claim 18,
wherein the heat generated by the motor is transmitted to the rotor blades through the first heat transfer member of which thermal conductivity is determined to allow transmitting, to the rotor blades, not less than 15% of the heat generated by the motor.

20. The propulsion system according to claim 1,
wherein the second heat transfer members have thermal conductivity higher than thermal conductivity of the rotor blades,
wherein the second heat transfer members transfer the heat from the first heat transfer member to the rotor blades respectively, and
wherein the second heat transfer members each includes at least one of a second heat conductor and a second heat transferring fluid.

* * * * *